(12) United States Patent
Saitoh

(10) Patent No.: US 8,134,787 B2
(45) Date of Patent: Mar. 13, 2012

(54) SUPER-WIDE ANGLE LENS

(75) Inventor: Ichiroh Saitoh, Nagano (JP)

(73) Assignee: Nidec Nissin Corporation (JP)

( * ) Notice: Subject to any disclaimer, the term of this patent is extended or adjusted under 35 U.S.C. 154(b) by 178 days.

(21) Appl. No.: 12/677,020

(22) PCT Filed: Sep. 7, 2008

(86) PCT No.: PCT/JP2008/002466
§ 371 (c)(1),
(2), (4) Date: Mar. 8, 2010

(87) PCT Pub. No.: WO2009/031324
PCT Pub. Date: Mar. 12, 2009

(65) Prior Publication Data
US 2010/0188757 A1    Jul. 29, 2010

(30) Foreign Application Priority Data

Sep. 7, 2007  (JP) ................... 2007-232568

(51) Int. Cl.
*G02B 13/04* (2006.01)
*G02B 13/18* (2006.01)

(52) U.S. Cl. .............. 359/753; 359/749; 359/715

(58) Field of Classification Search ............. 359/715, 359/734, 749, 753
See application file for complete search history.

(56) References Cited

U.S. PATENT DOCUMENTS
2007/0206295 A1   9/2007  Yamashita et al.

FOREIGN PATENT DOCUMENTS

| CN | 101029958 A | 9/2007 |
|---|---|---|
| EP | 1830211 A1 | 9/2007 |
| EP | 2187250 A1 * | 5/2010 |
| JP | 9-222558 A | 8/1997 |
| JP | 2003-232998 A | 8/2003 |
| JP | 2004-354572 A | 12/2004 |
| JP | 2006-119368 A | 5/2006 |
| JP | 2006-145770 A | 6/2006 |
| JP | 2006-171597 A | 6/2006 |
| JP | 2006-284620 A | 10/2006 |
| JP | 2007-233152 A | 9/2007 |

OTHER PUBLICATIONS

English translation of Written Opinion of the International Search Authority (PCT/ISA/237) for prepared for PCT/JP2008/002466 on Mar. 26, 2010.*
International Search Report for International application No. PCT/JP2008/002466 mailed Oct. 7, 2008.

* cited by examiner

*Primary Examiner* — David N Spector
(74) *Attorney, Agent, or Firm* — Cantor Colburn LLP

(57) ABSTRACT

A super wide angle lens is a super wide angle lens which is of high-resolution and whose size, weight and cost can be reduced. It employs a four-group five-element constitution in which in the order from an object side, a meniscus single lens having a negative power, a single lens having a negative power, a single lens having a positive power, and a cemented lens having a positive power are included. The lenses excluding the meniscus single lens are plastic lenses and seven lens surfaces, that are a third surface, a fourth surface, a fifth surface, a sixth surface, a eighth surface, a ninth surface and a tenth surface, are aspheric.

6 Claims, 4 Drawing Sheets

SUPER-WIDE ANGLE LENS

CROSS REFERENCE TO RELATED APPLICATIONS

This is a U.S. national stage application of International Application No. PCT/JP2008/002466, filed on 7 Sep. 2008. Priority under 35 U.S.C. §119(a) and 35 U.S.C. §365(b) is claimed from Japanese Application No. JP2007-232568, filed 7 Sep. 2007, the disclosure of which is also incorporated herein by reference.

FIELD OF THE INVENTION

The present invention relates to a super-wide angle lens (including a fisheye lens) whose angle of view is wide.

BACKGROUND ART

A super-wide angle and high resolution lens has been recently required as a lens for monitoring use and on-vehicle use. Since chromatic aberration of magnification is required to correct in order to attain a high resolution, a plurality of lenses is combined to correct chromatic aberration. In Patent References 1 and 2, lenses of four-group five-lenses whose viewing angle is not more than 100° are disclosed. In Patent References 3, 4 and 5, lenses structured of five-group six-lenses whose viewing angle is not less than 100° are disclosed.

[Patent Reference 1] Japanese Patent Laid-Open No. 2006-145770

[Patent Reference 2] Japanese Patent Laid-Open No. Hei 9-222558

[Patent Reference 3] Japanese Patent Laid-Open No. 2006-119368

[Patent Reference 4] Japanese Patent Laid-Open No. 2003-232998

[Patent Reference 5] Japanese Patent Laid-Open No. 2006-171597

DISCLOSURE OF THE INVENTION

Problems to be Solved by the Invention

A lens which is used in a monitoring camera, an on-vehicle camera and the like is required to be with a small size, light weight and a low cost, and its viewing angle is more than 100° and, in order to attain this requirement, it is desirable to reduce the number of pieces of lens which are used.

On the other hand, requirements for a small size, light weight and a low cost can be attained by using a plastic lens but, when a plastic lens is used, it is difficult to enhance its resolution. Therefore, it is difficult to attain a wide angle lens whose viewing angle is not less than 100° with a small size, light weight and a low cost by using a plastic lens.

Especially, in a super-wide angle lens whose viewing angle is 130° or more, or 150° or more or, in addition, in a super-wide angle lens whose viewing angle is 180° or more which is referred to as a fisheye lens, chromatic aberration of magnification is not sufficiently corrected. This is because, materials for a plastic lens are fewer than those for a glass lens for correcting chromatic aberration by a combination of materials for a plastic lens and thus the chromatic aberration of magnification cannot be sufficiently corrected. As a result, although other aberrations are corrected, resolution cannot be enhanced and thus a glass lens has to be used in order to eliminate chromatic aberration. Therefore, requirements for a small size, light weight and a low cost are not attained.

In view of the problem described above, an objective of the present invention is to provide a super-wide angle lens with a small size, light weight and a low cost in addition to a high resolution.

Means to Solve the Problems

In order to solve the problem, the present invention provides a super-wide angle lens which is constituted of four-group five-lenses. In the super-wide angle lens, at least four of five pieces of lenses are plastic lenses, and at least four lens faces are aspherical surfaces. In this case, it is further desirable that at least six surfaces are aspherical surfaces.

At least four of five pieces of lenses are plastic lenses and thus, even when a super-wide angle lens whose viewing angle is 130° or more, or 150° or more is constituted, or furthermore, even when a super-wide angle lens which is referred to as a fisheye lens whose viewing angle is 180° or more is constituted, the super-wide angle lens is made smaller, its weight is made lighter and its cost is reduced. Further, at least four lens faces, preferably six lens faces of the totaled nine lens faces are aspherical surfaces and thus chromatic aberration of magnification can be corrected with a fewer lenses. Therefore, according to the present invention, a super-wide angle lens with a small size, light weight, a low cost and a high resolution can be realized.

In the present invention, it is preferable that one of the at least four lens faces which are the aspherical surfaces is a cemented surface of a cemented lens. Since the cemented surface is an aspherical surface, chromatic aberration is corrected even when plastic lenses are cemented.

In the present invention, it is desirable that the aspherical surface amount "$X_\theta$" at the effective diameter "$\theta$" of the cemented surface and the center curvature radius "$R_0$" in the cemented surface satisfy the following conditional expression (1):

$$|X_\theta/R_0| \geq 1.1 \tag{1}$$

Further, in the present invention, it is desirable that the effective diameter "$\theta$" of the cemented surface and the center curvature radius "$R_0$" in the cemented surface satisfy the following conditional expression (2):

$$|(\theta/2)/R_0| \geq 1.2 \tag{2}$$

In addition, in the present invention, it is desirable that the effective diameter "$\theta$" of the cemented surface and the aspherical surface amount "$X_\theta$" at the effective diameter "$\theta$" of the cemented surface satisfy the following conditional expression (3):

$$|(\theta/2)/X_\theta| \leq 1.7 \tag{3}$$

In the present invention, a constitution may be adopted in which at least one of the above-mentioned conditional expressions (1), (2) and (3) is satisfied. A constitution satisfying all of these conditional expressions, a constitution satisfying only the conditional expressions (1) and (3), a constitution satisfying only the conditional expressions (2) and (3), a constitution satisfying only the conditional expression (1), a constitution satisfying only the conditional expression (2), and a constitution satisfying only the conditional expression (3) may be adopted. Chromatic aberration of magnification can be corrected with a fewer number of pieces of lenses by satisfying at least one of these conditions. Further, chromatic aberration of magnification can be corrected further surely by satisfying two or all of these conditions. Therefore, a super-wide angle lens with a small size, light weight, a low cost and a high resolution can be realized.

In the present invention, it is preferable that a refractive index "$n_d$" and an Abbe number "$v_d$" of a lens closest to an object side of the five pieces of lenses satisfy a following conditional expression (4):

$$n_d \leq 1.55 \text{ and } v_d \geq 50 \quad (4)$$

When this condition is satisfied, either glass material or plastic material may be used as lens material for the lens which is closest to the object side.

In the present invention, it is desirable that the cemented lens is a lens of a fourth group. In this case, a constitution may be adopted in which, in the five pieces of the lenses, a first lens from an object side has a negative power, a second lens from the object side has a negative power, a third lens from the object side has a positive or a negative power, a fourth lens from the object side which is the cemented lens has a negative or a positive power, a fifth lens from the object side which is the cemented lens has a positive or a negative power.

BEST MODE FOR CARRYING OUT THE INVENTION

Figure 1A:
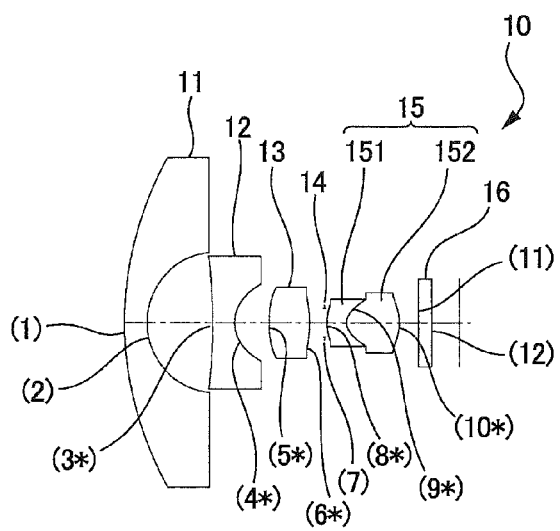
FIG. 1(a) is an explanatory view showing a super-wide angle lens in accordance with a first embodiment of the present invention.

Super-wide angle lenses in accordance with embodiments of the present invention will be described below. In the following description, so long as there is no specific designation, the unit is "mm".

Super-wide angle lenses in accordance with embodiments of the present invention are constituted of four-group five-lenses. At least four lenses of five pieces of lens are plastic lenses and at least four faces are aspherical surfaces. Further, one of at least four surfaces which are aspherical surfaces is formed to be a cemented surface of the cemented lens. In addition, the following conditional expressions (1), (2) and (3) are satisfied.

In other words, an aspherical surface amount "$X_\theta$" at an effective diameter "$\theta$" of the cemented surface of the cemented lens and a center curvature radius "$R_0$" of the cemented surface satisfy the following conditional expression (1);

$$|X_\theta / R_0| \geq 1.1 \quad (1)$$

Further, the effective diameter "$\theta$" of the cemented surface and the center curvature radius "$R_0$" in the cemented surface satisfy the following conditional expression (2);

$$|(\theta/2)/R_0| \geq 1.2 \quad (2)$$

In addition, the effective diameter "$\theta$" of cemented surface and an aspherical surface amount "$X_\theta$" at the effective diameter "$\theta$" of the cemented surface satisfy the following conditional expression (3);

$$|(\theta/2)/X_\theta| \leq 1.7 \quad (3)$$

In the embodiments, instead of the above-mentioned conditional expressions (1), (2) and (3), when the following conditional expressions (1a), (2a) and (3a) are satisfied, chromatic aberration is eliminated even when a further larger viewing angle and a brighter "F"-number are set;

$$|X_\theta / R_0| \geq 2.0 \quad (1a)$$

$$|(\theta/2)/R_0| \geq 2.0 \quad (2a)$$

$$|(\theta/2)/X_\theta| \leq 1.5 \quad (3a)$$

Next, a refractive index "$n_d$" and an Abbe number "$v_d$" of a lens which is closest to the object side of the five pieces of the lenses are desirable to satisfy the following conditional expression (4);

$$n_d \leq 1.55 \text{ and } v_d \geq 50 \quad (4)$$

EMBODIMENTS

Next, embodiments of a super-wide angle lens to which the present invention is applied will be described below with reference to the accompanying drawings. The center curvature radius "$R_0$" of the cemented surface, the aspherical surface amount "$X_\theta$" at an effective diameter "$\theta$" of the cemented surface, the value of the effective diameter "$\theta/2$" of the cemented surface of a cemented lens which is used in a first through a seventh embodiments (embodiments 1 through 7) which will be described below are collectively shown in Table 1. Further, the following values in the conditional expressions (1) through (3) are collectively shown in Table 1.

$|X_\theta / R_0|$ $|(\theta/2)/R_0|$ $|(\theta/2)/X_\theta|$

For the convenience of calculation, in a value of the sixth digit below the decimal point, the values calculated by using the values shown in Tables 2 through 8 may be different from the values shown in Table 1.

TABLE 1

|  | Embodiment 1 | Embodiment 2 | Embodiment 3 | Embodiment 4 | Embodiment 5 | Embodiment 6 | Embodiment 7 |
|---|---|---|---|---|---|---|---|
| Focal Length | 0.834 | 0.8 | 1.09 | 1.05 | 0.82 | 0.7 | 1.3 |
| Angle of View | 190 | 190 | 190 | 160 | 190 | 190 | 150 |
| $R_0$ | 0.45113 | 0.7 | 0.4 | 0.453726 | 0.4 | 0.464691 | −0.42 |
| $X_\theta$ | 0.702016 | 0.796421 | 1.045254 | 0.783815 | 1.139532 | 0.601775 | −1.62968 |
| $\theta/2$ | 0.8555 | 1.1185 | 1.0255 | 1.0285 | 1.1935 | 0.793 | 1.024 |
| Conditional Expression |  |  |  |  |  |  |  |
| $X_\theta/R_0$ | 1.556128 | 1.137745 | 2.613135 | 1.727507 | 2.84883 | 1.295001 | 3.88019 |
| $(\theta/2)/R_0$ | 1.896349 | 1.597857 | 2.56375 | 2.266788 | 2.98375 | 1.706511 | −2.4381 |
| $(\theta/2)/X_\theta$ | 1.218634 | 1.404407 | 0.981101 | 1.312173 | 1.04736 | 1.317767 | −0.62834 |

In the first through the seventh embodiments (embodiments 1 through 7) which will be described below, the first lens and the second lens from the object side of the five pieces of lens are provided with a negative power, and the third lens from the object side is provided with a positive power. The fourth lens and the fifth lens from the object side is constituted of a cemented lens where a lens having a positive power and a lens having a negative power are cemented. The third lens from the object side may be provided with a negative power.

In the first through the sixth embodiments, a cemented lens is constituted of the fourth lens and the fifth lens from the object side. In the cemented lens, the fourth lens from the object side is provided with a negative power and the fifth lens from the object side has a positive power. However, like the seventh embodiment, it may be constituted so that the fourth lens from the object side is provided with a positive power and the fifth lens from the object side is provided with a negative power.

In the first through the seventh embodiments, the number of aspherical surfaces is six or seven but the number of aspherical surfaces may be preferably four or more. Further, in the first through the seventh embodiments, a diaphragm is disposed between the third lens and the fourth lens from the object side but a diaphragm may be disposed between the second lens and the third lens from the object side. In addition, regarding the projection system, all of a stereoscopic projection system, an equidistance projection system, an equal stereoscopic projection system, and an orthographic projection system are applicable and a projection system which is provided with a specified relationship between a viewing angle and an image height is also applicable.

First Embodiment

Figure 1B:
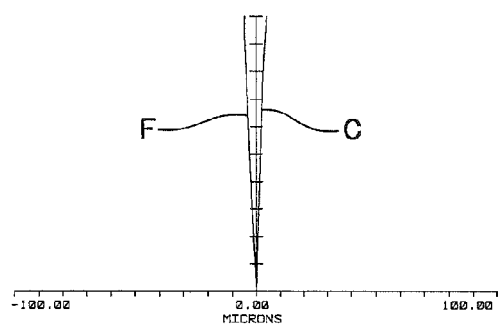
FIG. 1(b) is an aberration chart showing chromatic aberration of magnification of the super-wide angle lens.

FIG. 1(a) is an explanatory view showing a super-wide angle lens in accordance with a first embodiment of the present invention, and FIG. 1(b) is an aberration chart showing chromatic aberration of magnification of the super-wide angle lens. In FIG. 1(a), surface numbers corresponding to lens data and an aspherical surface coefficient are shown with a parenthesis, and surfaces whose surface number is added with "*" are aspherical surfaces. In FIG. 1(b), the aberration to an "F"-line is shown by the solid line "F" and the aberration to a "C"-line is shown by the solid line "C".

As shown in FIG. 1(a), a super-wide angle lens 10 (fisheye lens) is constituted of, in order from an object side, a first group composed of a meniscus single lens 11 having a negative power, a second group composed of a single lens 12 having a negative power, a third group composed of a single lens 13 having a positive power, and a fourth group composed of a cemented lens 15 having a positive power. In the cemented lens 15, the fourth lens 151 from the object side has a negative power and the fifth lens 152 from the object side has a positive power. Further, a diaphragm 14 is disposed between the single lens 13 and the cemented lens 15 and a cover glass 16 is disposed behind the cemented lens 15.

In the super-wide angle lens 10 in the first embodiment, the meniscus single lens 11 (first group) is a glass lens, but each of the single lens 12 (second group) and the single lens 13 (third group) is a plastic lens. Further, each of the lenses 151 and 152 constituting the cemented lens 15 (fourth group) is a plastic lens.

In the first embodiment, the refractive index and the Abbe number of the meniscus single lens 11 are as follows and the conditional expression (4) is satisfied.

Refractive index "$n_d$"=1.5168
Abbe number "$v_d$"=64.2

Respective lens data and aspherical surface coefficients of the super-wide angle lens 10 are shown in Table 2, and totaled seven surfaces, i.e., the third surface, the fourth surface, the fifth surface, the sixth surface, the eighth surface, the ninth surface and the tenth surface are aspherical surfaces.

TABLE 2

| Face Number | R | d | nd | vd | Effective Diameter | Aspherical Surface Coefficient | | | | |
|---|---|---|---|---|---|---|---|---|---|---|
|  |  |  |  |  |  | K | A4 | A6 | A8 | A10 |
| 1 | 12.374 | 0.800 | 1.5168 | 64.2 | 11.777 |  |  |  |  |  |
| 2 | 2.563 | 2.426 |  |  | 5.074 |  |  |  |  |  |
| 3* | −17.403 | 0.800 | 1.52996 | 55.8 | 4.821 | −233.398 | −0.00076 | −0.00013 | 9.51E−06 |  |
| 4* | 1.203 | 1.285 |  |  | 2.751 | −0.71717 | −0.00582 | 0.018467 | −0.00279 |  |
| 5* | 4.429 | 1.500 | 1.58547 | 29.9 | 2.586 | −0.41233 | 0.008581 | 0.015174 | −0.00375 |  |
| 6* | −3.935 | 0.555 |  |  | 1.976 | 0 | 0.019723 | −0.00546 |  |  |
| Diaphragm | Infinity | 0.100 |  |  | 1.058 |  |  |  |  |  |
| 8* | 1.841 | 0.700 | 1.58547 | 29.9 | 1.289 | −1.92713 | −0.01156 | 0.024463 |  |  |
| 9* (Cemented Face) | 0.451 | 1.902 | 1.52996 | 55.8 | 1.711 | −1.10009 | −0.1707 | 0.1312 | −0.02413 |  |

TABLE 2-continued

| Face Number | R | d | nd | vd | Effective Diameter | Aspherical Surface Coefficient | | | |
|---|---|---|---|---|---|---|---|---|---|
| | | | | | | K | A4 | A6 | A8 | A10 |
| 10* | −1.661 | 0.700 | | | 2.196 | −5.37519 | −0.04309 | 0.034263 | 0.019061 | |
| 11 | Infinity | 0.500 | 1.5168 | 64.2 | | | | | | |
| 12 | Infinity | 0.566 | | | | | | | | |
| Image Face | Infinity | | | | | | | | | |

Aspherical surface coefficients shown in Table 2 correspond to respective coefficients in the following aspherical surface function.

$$X = CY^2/[1+\sqrt{1-(K+1)C^2Y^2}] + A_4Y^4 + A_6DY^6 + A_8Y^8 + A_{10}Y^{10}$$

$$C = 1/R$$

Therefore, an aspherical surface amount "$X_\theta$" at an effective diameter "$\theta$" of the cemented surface of the cemented lens 15 is obtained by means of that an effective diameter $\theta/2$ is substituted for the above-mentioned expression.

The center curvature radius, the effective diameter and the aspherical surface amount of the cemented surface of the lenses 151 and 152 in the cemented lens 15 are as follows.

Center curvature radius "$R_0$"=0.45113≈0.451

Aspherical surface amount "$X_\theta$" at the effective diameter "$\theta$"=0.702016

Effective diameter "$\theta/2$"=0.8555

$|X_\theta/R_0|$=1.556128, which satisfies the conditional expression (1).

$|(\theta/2)/R_0|$=1.896349, which satisfies the conditional expression (2).

$|(\theta/2)/X_\theta|$=1.218634, which satisfies the conditional expression (3).

Further, the conditional expression (3a) is also satisfied.

The focal length of the super-wide angle lens 10 in the first embodiment is 0.834 and its angle of view is 190°. As described above, the super-wide angle lens 10 in the first embodiment is constituted of four-group five-lenses and at least four of five pieces of lens are plastic lenses. Therefore, even when a super-wide angle lens which is referred to as a fisheye lens whose angle of view is 180° or more is constituted, requirements for a small size, light weight and a low cost can be realized. Further, since at least four surfaces of totaled nine lens surfaces are aspherical surfaces, as shown in FIG. 1(b), chromatic aberration is corrected with a smaller number of pieces of lens and thus, even when plastic lenses are used, a high resolution about 1.3M can be realized which is applicable to an optical sensor for on-vehicle, for periphery monitoring of house facility and for security. Further, since a focal position deviation of light in a near-infrared zone can be suppressed, image quality is not significantly deteriorated even in a near-infrared zone.

Further, the entire optical length of the super-wide angle lens 10 from the sensor face is 14 mm or less and the effective diameter of the object side lens is "φ" 14 mm or less and thus a size of an imaging device can be reduced. In addition, since a visual field angle of the optical sensor can be set in 190°, even when arranged on a ceiling or the like, a dead angle becomes smaller and thus the entire room can be monitored without moving the optical sensor (monitor camera).

Second Embodiment

Figure 2A:
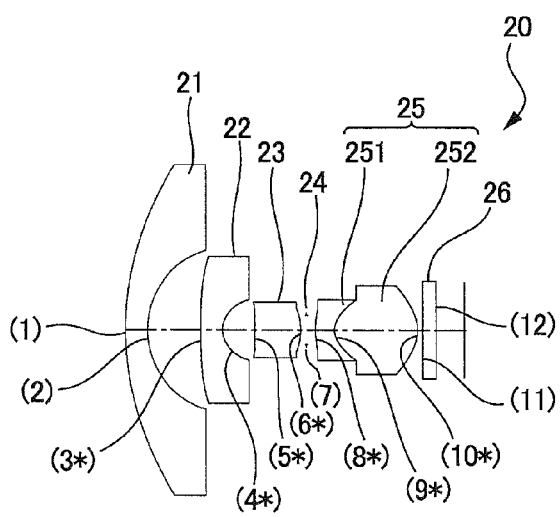
FIG. 2(a) is an explanatory view showing a super-wide angle lens in accordance with a second embodiment of the present invention.
Figure 2B:
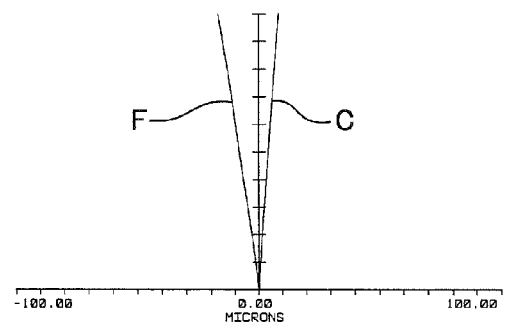
FIG. 2(b) is an aberration chart showing chromatic aberration of magnification of the super-wide angle lens.

FIG. 2(a) is an explanatory view showing a super-wide angle lens in accordance with a second embodiment of the present invention, and FIG. 2(b) is an aberration chart showing chromatic aberration of magnification of the super-wide angle lens. Basic constitutions of wide-angle lenses in accordance with a second through a seventh embodiments which will be described below are similar to the first embodiment and thus descriptions of common portions are omitted.

As shown in FIG. 2(a), similarly to the first embodiment, a super-wide angle lens 20 (fisheye lens) in a second embodiment is also constituted of, in order from an object side, a first group composed of a meniscus single lens 21 having a negative power, a second group composed of a single lens 22 having a negative power, a third group composed of a single lens 23 having a positive power, and a fourth group composed of a cemented lens 25 having a positive power. In the cemented lens 25, a fourth lens 251 from the object side has a negative power and a fifth lens 252 from the object side has a positive power. Further, a diaphragm 24 is disposed between the single lens 23 and the cemented lens 25 and a cover glass 26 is disposed behind the cemented lens 25.

In the super-wide angle lens 20 in the second embodiment, the meniscus single lens 21 (first group) is a glass lens, but each of the single lens 22 (second group), the single lens 23 (third group) and the lenses 251 and 252 constituting the cemented lens 25 (fourth group) is a plastic lens.

In the second embodiment, the refractive index and the Abbe number of the meniscus single lens 21 are as follows and the conditional expression (4) is satisfied.

Refractive index "$n_d$"=1.5168

Abbe number "$v_d$"=64.2

Respective lens data and aspherical surface coefficients of the super-wide angle lens 20 are shown in Table 3, and totaled seven surfaces, i.e., the third surface, the fourth surface, the fifth surface, the sixth surface, the eighth surface, the ninth surface and the tenth surface are aspherical surfaces.

TABLE 3

| Face Number | R | d | nd | vd | Effective Diameter | Aspherical Surface Diameter | | | |
|---|---|---|---|---|---|---|---|---|---|
| | | | | | | K | A4 | A6 | A8 | A10 |
| 1 | 11.091 | 0.800 | 1.5168 | 64.2 | 12.034 | | | | | |
| 2 | 3.055 | 2.008 | | | 5.858 | | | | | |
| 3* | 64.238 | 0.800 | 1.52996 | 55.8 | 5.413 | 199.3963 | 0.006647 | −0.00053 | 2.24E−05 | |
| 4* | 0.892 | 1.221 | | | 2.213 | −0.4098 | −0.10124 | 0.056505 | −0.00923 | |

TABLE 3-continued

| Face Number | R | d | nd | vd | Effective Diameter | Aspherical Surface Diameter | | | |
|---|---|---|---|---|---|---|---|---|---|
| | | | | | | K | A4 | A6 | A8 | A10 |
| 5* | 47.610 | 1.703 | 1.58547 | 29.9 | 2.024 | 0 | −0.0548 | 0.023882 | −0.03563 | |
| 6* | −2.258 | 0.214 | | | 1.581 | 0 | −0.06192 | 0.019954 | | |
| Diaphragm | Infinity | 0.350 | | | 1.073 | | | | | |
| 8* | 2.807 | 0.700 | 1.58547 | 29.9 | 1.567 | −3.85848 | −0.05599 | 0.024294 | | |
| 9* (Cemented Face) | 0.700 | 3.048 | 1.52996 | 55.8 | 2.237 | −0.69549 | −0.21599 | 0.044415 | −0.06811 | |
| 10* | −1.338 | 0.200 | | | 3.255 | −3.15915 | −0.04144 | 0.011882 | −0.0016 | |
| 11 | Infinity | 0.500 | 1.5168 | 64.2 | | | | | | |
| 12 Image Face | Infinity Infinity | 1.106 | | | | | | | | |

In the super-wide angle lens 20, the center curvature radius, the effective diameter and the aspherical surface amount of the cemented surface of the lenses 251 and 252 in the cemented lens 25 are as follows.

Center curvature radius "$R_0$"=0.700

Aspherical surface amount "$X_\theta$" at the effective diameter "$\theta$"=0.796421

Effective diameter "$\theta/2$"=1.1185

$|X_\theta/R_0|$=1.137745, which satisfies the conditional expression (1).

$|(\theta/2)/R_0|$=1.597857, which satisfies the conditional expression (2).

$|(\theta/2)/X_\theta|$=1.404407, which satisfies the conditional expression (3).

Further, the conditional expression (3a) is also satisfied.

A focal length of the super-wide angle lens 20 constituted as described above is 0.8 and its angle of view is 190°.

Third Embodiment

Figure 3A:
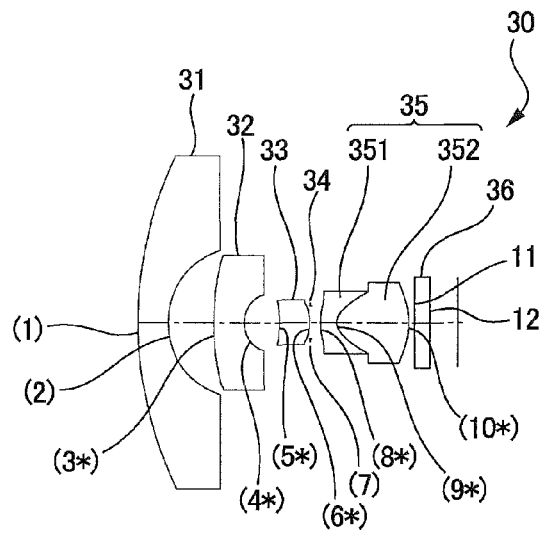
FIG. 3(a) is an explanatory view showing a super-wide angle lens in accordance with a third embodiment of the present invention.
Figure 3B:
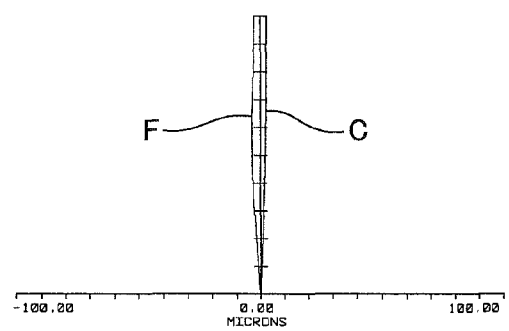
FIG. 3(b) is an aberration chart showing chromatic aberration of magnification of the super-wide angle lens.

FIG. 3(a) is an explanatory view showing a super-wide angle lens in accordance with a third embodiment of the present invention, and FIG. 3(b) is an aberration chart showing chromatic aberration of magnification of the super-wide angle lens. As shown in FIG. 3(a), similarly to the first embodiment, a super-wide angle lens 30 (fisheye lens) in a third embodiment is also constituted of, in order from an object side, a first group composed of a meniscus single lens 31 having a negative power, a second group composed of a single lens 32 having a negative power, a third group composed of a single lens 33 having a positive power, and a fourth group composed of a cemented lens 35 having a positive power. In the cemented lens 35, a fourth lens 351 from the object side has a negative power and a fifth lens 352 from the object side has a positive power. Further, a diaphragm 34 is disposed between the single lens 33 and the cemented lens 35 and a cover glass 36 is disposed behind the cemented lens 35.

In the super-wide angle lens 30, the meniscus single lens 31 (first group) is a glass lens, but each of the single lens 32 (second group), the single lens 33 (third group) and the lenses 351 and 352 constituting the cemented lens 35 (fourth group) is a plastic lens.

The refractive index and the Abbe number of the meniscus single lens 31 are as follows and the conditional expression (4) is satisfied.

Refractive index "$n_d$"=1.5168

Abbe number "$v_d$"=64.2

Respective lens data and aspherical surface coefficients of the super-wide angle lens 30 are shown in Table 4, and totaled seven surfaces, i.e., the third surface, the fourth surface, the fifth surface, the sixth surface, the eighth surface, the ninth surface and the tenth surface are aspherical surfaces.

TABLE 4

| Face Number | R | d | nd | vd | Effective Diameter | Aspherical Surface Coefficient | | | | |
|---|---|---|---|---|---|---|---|---|---|---|
| | | | | | | K | A4 | A6 | A8 | A10 |
| 1 | 12.545 | 1.000 | 1.5168 | 64.2 | 10.841 | | | | | |
| 2 | 2.500 | 1.536 | | | 4.757 | | | | | |
| 3* | 11.609 | 1.000 | 1.52996 | 55.8 | 4.420 | −2.27027 | 0.004706 | −0.00023 | | |
| 4* | 1.065 | 1.182 | | | 1.836 | 0.267261 | 0.00905 | −0.02201 | 0.048845 | |
| 5* | −5.757 | 1.000 | 1.58547 | 29.9 | 1.474 | −6.82698 | −0.08724 | 0.053759 | −0.18269 | |
| 6* | −1.440 | 0.020 | | | 1.322 | −1.65224 | −0.09178 | −0.02101 | | |
| Diaphragm | Infinity | 0.350 | | | 1.078 | | | | | |
| 8* | 2.181 | 0.550 | 1.58547 | 29.9 | 1.552 | −0.15391 | −0.06663 | 0.000957 | 0.045124 | −0.03402 |
| 9* (Cemented Face) | 0.400 | 2.409 | 1.52996 | 55.8 | 2.051 | −1.11322 | −0.23736 | 0.258973 | −0.13137 | 0.026687 |
| 10* | −2.259 | 0.200 | | | 2.650 | −0.4944 | 0.029937 | −0.007 | 0.004049 | −0.00048 |
| 11 | Infinity | 0.500 | 1.5168 | 64.2 | | | | | | |
| 12 Image Face | Infinity Infinity | 1.078 | | | | | | | | |

In the super-wide angle lens 30, the center curvature radius, the effective diameter and the aspherical surface amount of the cemented surface of the lenses 351 and 352 in the cemented lens 35 are as follows.

Center curvature radius "$R_0$"=0.400
Aspherical surface amount "$X_\theta$" at the effective diameter "$\theta$"=1.045254

Effective diameter "$\theta/2$"=1.0255

$|X_\theta/R_0|$=2.613135, which satisfies the conditional expression (1).

$|(\theta/2)/R_0|$=2.56375, which satisfies the conditional expression (2).

$|(\theta/2)/X_\theta|$=0.981101, which satisfies the conditional expression (3).

Further, the conditional expressions (1a), (2a) and (3a) are satisfied.

A focal length of the super-wide angle lens 30 which is constituted as described above is 1.09 and its angle of view is 190°.

Fourth Embodiment

Figure 4A:
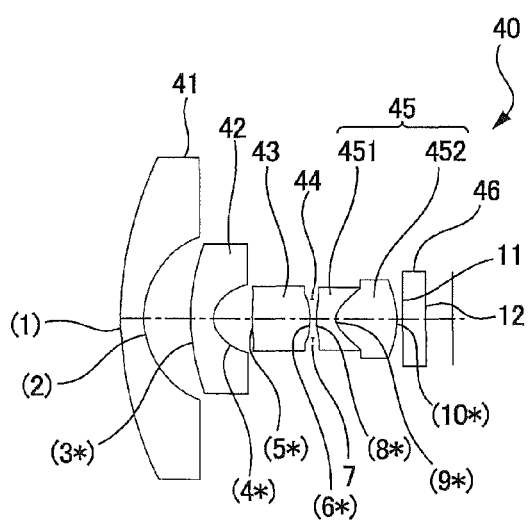
FIG. 4(a) is an explanatory view showing a super-wide angle lens in accordance with a fourth embodiment of the present invention.
Figure 4B:
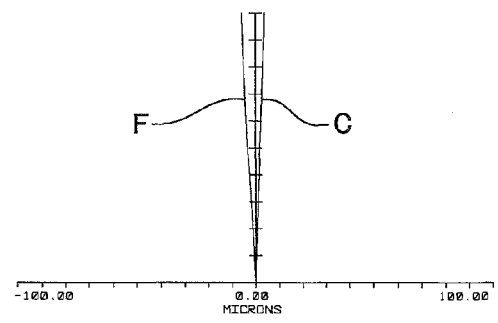
FIG. 4(b) is an aberration chart showing chromatic aberration of magnification of the super-wide angle lens.

FIG. 4(a) is an explanatory view showing a super-wide angle lens in accordance with a fourth embodiment of the present invention, and FIG. 4(b) is an aberration chart showing chromatic aberration of magnification of the super-wide angle lens. As shown in FIG. 4(a), similarly to the first embodiment, a super-wide angle lens 40 (fisheye lens) in a fourth embodiment is also constituted of, in order from an object side, a first group composed of a meniscus single lens 41 having a negative power, a second group composed of a single lens 42 having a negative power, a third group composed of a single lens 43 having a positive power, and a fourth group composed of a cemented lens 45 having a positive power. In the cemented lens 45, a fourth lens 451 from the object side has a negative power and a fifth lens 452 from the object side has a positive power. Further, a diaphragm 44 is disposed between the single lens 43 and the cemented lens 45 and a cover glass 46 is disposed behind the cemented lens 45.

In the super-wide angle lens 40, the meniscus single lens 41 (first group) is a glass lens, but each of the single lens 42 (second group), the single lens 43 (third group) and the lenses 451 and 452 constituting the cemented lens 45 (fourth group) is a plastic lens.

The refractive index and the Abbe number of the meniscus single lens 41 are as follows and the conditional expression (4) is satisfied.

Refractive index "$n_d$"=1.5168

Abbe number "$v_d$"=64.2

Respective lens data and aspherical surface coefficients of the super-wide angle lens 40 are shown in Table 5, and totaled seven surfaces, i.e., the third surface, the fourth surface, the fifth surface, the sixth surface, the eighth surface, the ninth surface and the tenth surface are aspherical surfaces.

TABLE 5

| Face Number | R | d | nd | vd | Effective Diameter | Aspherical Surface Coefficient | | | |
|---|---|---|---|---|---|---|---|---|---|
| | | | | | | K | A4 | A6 | A8 | A10 |
| 1 | 12.985 | 0.800 | 1.5168 | 64.2 | 10.151 | | | | | |
| 2 | 3.077 | 1.665 | | | 5.550 | | | | | |
| 3* | 8.098 | 0.800 | 1.52996 | 55.8 | 4.755 | 0.414908 | 0.004323 | −0.00085 | 4.06E−05 | |
| 4* | 0.878 | 1.372 | | | 2.328 | −0.56222 | −0.03905 | 0.028519 | 0.008751 | |
| 5* | 9.656 | 2.031 | 1.58547 | 29.9 | 2.146 | 0 | −0.0383 | 0.03082 | −0.02497 | |
| 6* | −2.143 | 0.081 | | | 1.705 | 0 | −0.04128 | 0.020551 | | |
| Diaphragm | Infinity | 0.150 | | | 1.348 | | | | | |
| 8* | 2.862 | 0.700 | 1.58547 | 29.9 | 1.544 | −15.8163 | −0.02226 | 0.013964 | | |
| 9* (Cemented Face) | 0.454 | 2.154 | 1.52996 | 55.8 | 2.057 | −1.35172 | −0.1804 | 0.166192 | −0.06583 | |
| 10* | −2.327 | 0.200 | | | 2.582 | −9.37741 | −0.04229 | 0.01828 | −0.00041 | |
| 11 | Infinity | 0.800 | 1.5168 | 64.2 | | | | | | |
| 12 | Infinity | 1.348 | | | | | | | | |
| Image Face | Infinity | | | | | | | | | |

In the super-wide angle lens 40, the center curvature radius, the effective diameter and the aspherical surface amount of the cemented surface of the lenses 451 and 452 in the cemented lens 45 are as follows.

Center curvature radius "$R_0$"=0.453726≈0.454

Aspherical surface amount "$X_θ$" at the effective diameter "θ"=0.783815

Effective diameter "θ/2"=1.0285

$|X_θ/R_0|$=1.727507, which satisfies the conditional expression (1).

Refractive index "$n_d$"=1.52996

Abbe number "$v_d$"=55.8

Respective lens data and aspherical surface coefficients of the super-wide angle lens 50 are shown in Table 6, and totaled seven surfaces, i.e., the third surface, the fourth surface, the fifth surface, the sixth surface, the eighth surface, the ninth surface and the tenth surface are aspherical surfaces.

TABLE 6

| Face Number | R | d | nd | vd | Effective Diameter | Aspherical Surface Coefficient | | | | |
|---|---|---|---|---|---|---|---|---|---|---|
| | | | | | | K | A4 | A6 | A8 | A10 |
| 1 | 11.064 | 0.800 | 1.52996 | 55.8 | 11.717 | | | | | |
| 2 | 2.626 | 2.164 | | | 5.189 | | | | | |
| 3* | −77.754 | 0.800 | 1.52996 | 55.8 | 4.932 | 0 | 0.008491 | −0.00067 | 2.04E−06 | |
| 4* | 1.000 | 1.628 | | | 2.314 | −0.47379 | −0.01097 | 0.011599 | 0.028431 | |
| 5* | 12.694 | 1.100 | 1.58547 | 29.9 | 1.935 | −522.089 | −0.02737 | −0.01015 | −0.02785 | |
| 6* | −2.365 | 0.291 | | | 1.836 | 0 | −0.07142 | 0.008725 | | |
| Diaphragm | Infinity | 0.450 | | | 1.139 | | | | | |
| 8* | 2.215 | 0.700 | 1.58547 | 29.9 | 1.698 | −4.929 | −0.06233 | 0.01837 | | |
| 9* (Cemented Face) | 0.400 | 2.660 | 1.52996 | 55.8 | 2.387 | −1.09519 | −0.3301 | 0.175855 | −0.05062 | |
| 10* | −1.520 | 0.500 | | | 2.897 | −1.58821 | 0.016689 | −0.01257 | 0.005228 | |
| 11 | Infinity | 0.500 | 1.5168 | 64.2 | | | | | | |
| 12 | Infinity | 0.760 | | | | | | | | |
| Image Face | Infinity | | | | | | | | | |

$|(θ/2)/R_0|$=2.266788, which satisfies the conditional expression (2).

$|(θ/2)/X_θ|$=1.312173, which satisfies the conditional expression (3).

Further, the conditional expressions (2a) and (3a) are satisfied.

A focal length of the super-wide angle lens 40 which is constituted as described above is 1.05 and its angle of view is 160°.

Fifth Embodiment

Figure 5A:
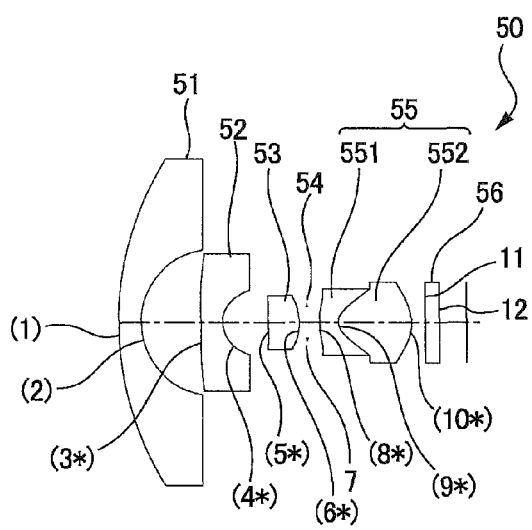
FIG. 5(a) is an explanatory view showing a super-wide angle lens in accordance with a fifth embodiment of the present invention.
Figure 5B:
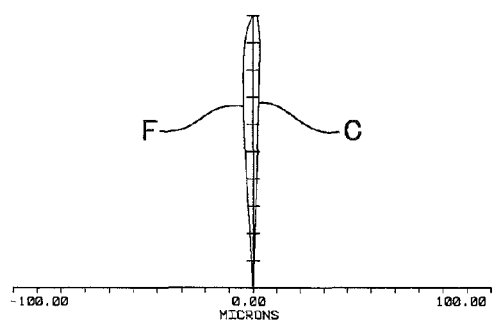
FIG. 5(b) is an aberration chart showing chromatic aberration of magnification of the super-wide angle lens.

FIG. 5(a) is an explanatory view showing a super-wide angle lens in accordance with a fifth embodiment of the present invention, and FIG. 5(b) is an aberration chart showing chromatic aberration of magnification of the super-wide angle lens. As shown in FIG. 5(a), similarly to the first embodiment, a super-wide angle lens 50 (fisheye lens) in a fifth embodiment is also constituted of, in order from an object side, a first group composed of a meniscus single lens 51 having a negative power, a second group composed of a single lens 52 having a negative power, a third group composed of a single lens 53 having a positive power, and a fourth group composed of a cemented lens 55 having a positive power. In the cemented lens 55, a fourth lens 551 from the object side has a negative power and a fifth lens 552 from the object side has a positive power. Further, a diaphragm 54 is disposed between the single lens 53 and the cemented lens 55 and a cover glass 56 is disposed behind the cemented lens 55.

In the super-wide angle lens 50 in the fifth embodiment, different from the first embodiment, each of the meniscus single lens 51 (first group), the single lens 52 (second group), the single lens 53 (third group), and the lenses 551 and 552 constituting the cemented lens 55 (fourth group) is a plastic lens.

In the fifth embodiment, the refractive index and the Abbe number of the meniscus single lens 51 are as follows and the conditional expression (4) is satisfied.

The center curvature radius, the effective diameter and the aspherical surface amount of the cemented surface of the lenses 551 and 552 in the cemented lens 55 are as follows.

Center curvature radius "$R_0$"=0.400

Aspherical surface amount "$X_θ$" at the effective diameter "θ"=1.139532

Effective diameter "θ/2"=1.1935

$|X_θ/R_0|$=2.84883, which satisfies the conditional expression (1).

$|(θ/2)/R_0|$=2.98375, which satisfies the conditional expression (2).

$|(θ/2)/X_θ|$=1.04736, which satisfies the conditional expression (3).

Further, the conditional expressions (1a), (2a) and (3a) are satisfied.

A focal length of the super-wide angle lens 50 which is constituted as described above is 0.82 and its angle of view is 190°.

Sixth Embodiment

Figure 6A:
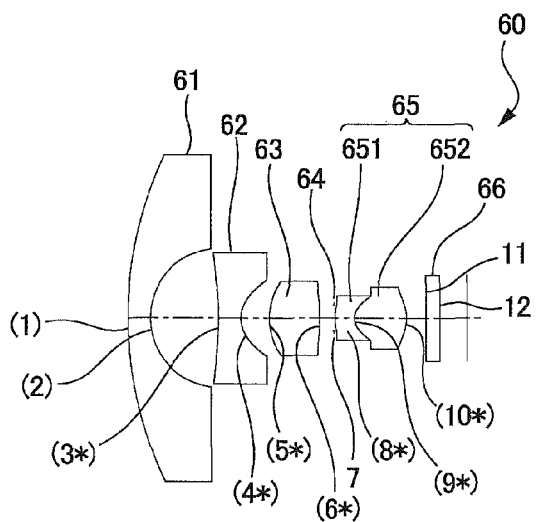
FIG. 6(a) is an explanatory view showing a super-wide angle lens in accordance with a sixth embodiment of the present invention.
Figure 6B:
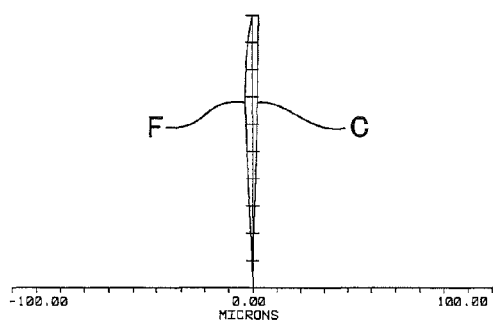
FIG. 6(b) is an aberration chart showing chromatic aberration of magnification of the super-wide angle lens.

FIG. 6(a) is an explanatory view showing a super-wide angle lens in accordance with a sixth embodiment of the present invention, and FIG. 6(b) is an aberration chart showing chromatic aberration of magnification of the super-wide angle lens. As shown in FIG. 6(a), similarly to the first embodiment, a super-wide angle lens 60 (fisheye lens) in a sixth embodiment is also constituted of, in order from an object side, a first group composed of a meniscus single lens 61 having a negative power, a second group composed of a single lens 62 having a negative power, a third group composed of a single lens 63 having a positive power, and a fourth group composed of a cemented lens 65 having a positive power. In the cemented lens 65, a fourth lens 651 from the object side has a negative power and a fifth lens 652 from the object side has a positive power. Further, a diaphragm 64 is disposed between the single lens 63 and the cemented lens 65 and a cover glass 66 is disposed behind the cemented lens 65.

In the super-wide angle lens 60 in the sixth embodiment, the meniscus single lens 61 (first group) is a glass lens, but each of the single lens 62 (second group), the single lens 63 (third group) and the lenses 651 and 652 constituting the cemented lens 65 (fourth group) is a plastic lens.

In the sixth embodiment, the refractive index and the Abbe number of the meniscus single lens 61 are as follows and the conditional expression (4) is satisfied.

Refractive index "$n_d$"=1.5168
Abbe number "$v_d$"=64.2

Figure 7A:
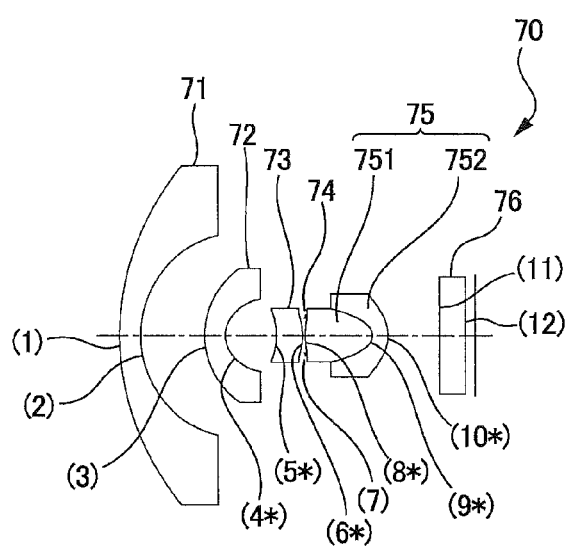
FIG. 7(a) is an explanatory view showing a super-wide angle lens in accordance with a seventh embodiment of the present invention.
Figure 7B:
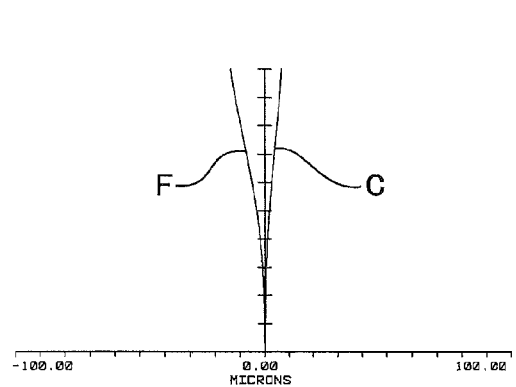
FIG. 7(b) is an aberration chart showing chromatic aberration of magnification of the super-wide angle lens.

Respective lens data and aspherical surface coefficients of the super-wide angle lens 60 are shown in Table 7, and totaled seven surfaces, i.e., the third surface, the fourth surface, the fifth surface, the sixth surface, the eighth surface, the ninth surface and the tenth surface are aspherical surfaces.

present invention, and FIG. 7(b) is an aberration chart showing chromatic aberration of magnification of the super-wide angle lens. As shown in FIG. 7(a), similarly to the first embodiment, a super-wide angle lens 70 in a seventh embodiment is also constituted of, in order from an object side, a first group composed of a meniscus single lens 71 having a negative power, a second group composed of a single lens 72 having a negative power, a third group composed of a single lens 73 having a positive power, and a fourth group composed of a cemented lens 75 having a positive power. Further, a diaphragm 74 is disposed between the single lens 73 and the cemented lens 75 and a cover glass 76 is disposed behind the cemented lens 75.

In the cemented lens 75 in the seventh embodiment, different from the first embodiment, a fourth lens 751 from the

TABLE 7

| Face Number | R | d | nd | vd | Effective Diameter | K | A4 | A6 | A8 | A10 |
|---|---|---|---|---|---|---|---|---|---|---|
| 1 | 13.685 | 0.800 | 1.5168 | 64.2 | 11.691 | | | | | |
| 2 | 2.489 | 2.472 | | | 4.943 | | | | | |
| 3* | −6.319 | 0.800 | 1.52996 | 55.8 | 4.687 | −156.067 | −0.00055 | −0.00017 | 1.31E−05 | |
| 4* | 1.038 | 1.010 | | | 2.737 | −0.78132 | −0.04266 | 0.012568 | −0.00011 | |
| 5* | 2.278 | 1.800 | 1.58547 | 29.9 | 2.634 | −1.95154 | 0.0021 | 0.012493 | −0.00102 | |
| 6* | −5.436 | 0.506 | | | 1.786 | 0 | −0.00489 | 0.00694 | | |
| Diaphragm | Infinity | 0.050 | | | 0.903 | | | | | |
| 8* | 1.774 | 0.700 | 1.58547 | 29.9 | 1.059 | −2.66995 | −0.01369 | 0.035269 | | |
| 9* (Cemented Face) | 0.465 | 1.885 | 1.52996 | 55.8 | 1.586 | −1.12732 | −0.13126 | 0.167603 | −0.07282 | |
| 10* | −1.268 | 0.700 | | | 2.202 | −4.28917 | −0.03557 | 0.041996 | 0.010445 | |
| 11 | Infinity | 0.500 | 1.5168 | 64.2 | 3.079 | | | | | |
| 12 | Infinity | 0.293 | | | 3.358 | | | | | |
| Image Face | Infinity | | | | 3.636 | | | | | |

The center curvature radius, the effective diameter and the aspherical surface amount of the cemented surface of the lenses 651 and 652 in the cemented lens 65 are as follows.

Center curvature radius "$R_0$"=0.464691≈0.465
Aspherical surface amount "$X_\theta$" at the effective diameter "$\theta$"=0.601775
Effective diameter "$\theta/2$"=0.793
$|X_\theta/R_0|$=1.295001, which satisfies the conditional expression (1).
$|(\theta/2)/R_0|$=1.706511, which satisfies the conditional expression (2).
$|(\theta/2)/X_\theta|$=1.317767, which satisfies the conditional expression (3).
Further, the conditional expression (3a) is satisfied.

A focal length of the super-wide angle lens 60 which is constituted as described above is 0.7 and its angle of view is 190°.

Seventh Embodiment

FIG. 7(a) is an explanatory view showing a super-wide angle lens in accordance with a seventh embodiment of the object side has a positive power and a fifth lens 752 from the object side has a negative power.

In the super-wide angle lens 70 in the seventh embodiment, the meniscus single lens 71 (first group) is a glass lens, but each of the single lens 72 (second group), the single lens 73 (third group) and the lenses 751 and 752 constituting the cemented lens 75 (fourth group) is a plastic lens.

In the seventh embodiment, the refractive index and the Abbe number of the meniscus single lens 71 are as follows and the conditional expression (4) is satisfied.

Refractive index "$n_d$"=1.5168
Abbe number "$v_d$"=64.2

Respective lens data and aspherical surface coefficients of the super-wide angle lens 70 are shown in Table 8 and, in this embodiment, different from the first embodiment, totaled six surfaces, i.e., the fourth surface, the fifth surface, the sixth surface, the eighth surface, the ninth surface and the tenth surface are aspherical surfaces.

TABLE 8

| Face Number | R | d | nd | vd | Effective Diameter | Aspherical Surface Coefficient | | | | |
|---|---|---|---|---|---|---|---|---|---|---|
| | | | | | | K | A4 | A6 | A8 | A10 |
| 1 | 10.000 | 0.800 | 1.5168 | 64.2 | 13.033 | | | | | |
| 2 | 3.965 | 2.500 | | | 7.692 | | | | | |
| 3 | 3.100 | 0.800 | 1.52996 | 55.8 | 5.156 | | | | | |
| 4* | 1.082 | 2.000 | | | 2.787 | −0.4271 | −0.01461 | −0.0036 | | |
| 5* | −2.970 | 1.000 | 1.58547 | 29.9 | 2.078 | 0 | −0.01791 | 0.000318 | | |
| 6* | −2.664 | 0.100 | | | 1.669 | 0 | −0.02963 | 0.015293 | | |
| Diaphragm | Infinity | 0.000 | | | 1.340 | | | | | |
| 8* | 3.521 | 2.600 | 1.52996 | 55.8 | 1.452 | −7.67345 | −0.0048 | 0.020849 | | |
| 9* (Cemented Face) | −0.420 | 0.600 | 1.58547 | 29.9 | 2.048 | −0.88904 | −0.07164 | 0.022356 | | |
| 10* | −1.428 | 2.000 | | | 3.188 | −1.06585 | 0.016095 | −0.00253 | 0.000839 | |
| 11 | Infinity | 1.000 | 1.5168 | 64.2 | | | | | | |
| 12 | Infinity | 0.386 | | | | | | | | |
| Image Face | Infinity | | | | | | | | | |

The center curvature radius, the effective diameter and the aspherical surface amount of the cemented surface of the lenses 751 and 752 in the cemented lens 75 are as follows.

Center curvature radius "$R_0$"=−0.42

Aspherical surface amount "$X_\theta$" at the effective diameter "$\theta$"=−1.62968

Effective diameter "$\theta/2$"=1.024

$|X_\theta/R_0|$=3.88019, which satisfies the conditional expression (1).

$|(\theta/2)/R_0|$=2.4381, which satisfies the conditional expression (2).

$|(\theta/2)/X_\theta|$=0.62834, which satisfies the conditional expression (3).

Further, the conditional expressions (1a), (2a) and (3a) are satisfied.

A focal length of the super-wide angle lens 70 which is constituted as described above is 1.3 and its angle of view is 150°.

The invention claimed is:

1. A super-wide angle lens comprising:
   a four-group, five-element constitution which includes one cemented lens composed of two lens elements, wherein
   at least four of the five lens elements are plastic lenses,
   two of the plastic lenses are cemented to form the cemented lens,
   at least six lens faces of the four plastic lenses are aspherical surfaces, and
   one of the aspherical surfaces is formed on a cemented surface of the cemented lens, and wherein
   following conditional expressions (a) through (e) are satisfied.

$|X_\theta/Ro| \geq 1.13$ (a)

$|(\theta/2)/Ro| \geq 1.59$ (b)

$|(\theta/2)/X_\theta| \leq 1.41$ (c)

$f \leq 1.1$ (d)

$\alpha \geq 180°$ (e)

where
   θ: Effective diameter of the cemented surface
   $X_\theta$: Aspherical surface amount at the effective diameter "θ" of the cemented surface
   Ro: Center curvature radius in the cemented surface
   f: Focal length of the super-wide angle lens, and
   α: Horizontal angle of view of the super-wide angle lens.

2. The super-wide angle lens according to claim 1, wherein the lens element located closest to an object side among the five lens elements has a refractive index "$n_d$" and an Abbe number "$v_d$" on a "d"-line thereof, satisfying the following conditions:

$n_d \leq 1.55$ and $v_d \geq 50$.

3. The super-wide angle lens according to claim 1, wherein the cemented lens belongs to a fourth group of the four-group, five-lens element constitution.

4. The super-wide angle lens according to claim 1, wherein the five lens elements include a first lens having a negative power, a second lens having a negative power, a third lens having a positive or a negative power, a fourth lens having a negative power, and a fifth lens having a positive power, arranged in this order from an object side, and wherein,
   the fourth lens element and fifth lens element are cemented to form the cemented lens and belong to a fourth group of the four-group, five-element constitution.

5. The super-wide angle lens according to claim 1, wherein following conditional expressions (a1) through (c1) are satisfied.

$1.13 \leq |X_\theta/Ro| \leq 2.85$ (a1)

$1.59 \leq |(\theta/2)/Ro| \leq 2.99$ (b1)

$0.98 \leq |(\theta/2)/X_\theta| \leq 1.41$ (c1)

6. The super-wide angle lens according to claim 1, wherein the horizontal angle of view α is 190°.

* * * * *